United States Patent [19]

Butler et al.

[11] E Patent Number: Re. 32,280

[45] Reissued Date of Patent: Nov. 11, 1986

[54] SPIN COOLER

[76] Inventors: Donald L. Butler, 1300-H Steinbeck Dr., Raleigh, N.C. 27609; Thomas E. Martin, 1011 Manchester Dr., Cary, N.C. 27511

[21] Appl. No.: 776,622

[22] Filed: Sep. 16, 1985

Related U.S. Patent Documents

Reissue of:

[64] Patent No.: 4,531,382
Issued: Jul. 30, 1985
Appl. No.: 524,448
Filed: Aug. 18, 1983

[51] Int. Cl.[4] ..... F25D 17/02

[52] U.S. Cl. ..... 62/375; 62/380; 198/735; 198/801

[58] Field of Search ..... 62/375, 376, 380, 374, 62/63; 198/735, 801, 726, 727, 561

[56] References Cited

U.S. PATENT DOCUMENTS

| | | | |
|---|---|---|---|
| 5,816 | 9/1848 | Scoville | 198/561 |
| 1,301,428 | 4/1919 | Gitterman | 198/728 |
| 2,184,990 | 12/1939 | Conn | 62/375 |
| 2,717,548 | 9/1955 | Blair, Jr. | 198/728 |
| 2,923,138 | 2/1960 | Rollins | 62/380 |
| 3,139,176 | 6/1964 | Bliss | 198/728 |
| 3,605,434 | 9/1971 | Boese | 62/380 |
| 4,261,181 | 4/1981 | Hofstetter | 62/375 |
| 4,304,105 | 12/1981 | West | 62/375 |

*Primary Examiner*—Ronald C. Capossela

[57] ABSTRACT

This invention is a cooling device for cans and similar containers and is specifically designed for installation where floor space is either limited or at a premium. Additionally, there is a unique liquid circulation system which is extremely effective in cooling and yet low in energy consumption.

8 Claims, 7 Drawing Figures

SPIN COOLER

Matter enclosed in heavy brackets [ ] appears in the original patent but forms no part of this reissue specification; matter printed in italics indicates the additions made by reissue.

FIELD OF THE INVENTION

This invention relates to food processing equipment and more particularly to cooling systems for can and similar food containers.

BACKGROUND OF INVENTION

Since man first began preserving foods in can type containers, the rapid cooling of these containers after heating to preserve the contents thereof has been a problem. If the cans are not cooled evenly, hot spots will develop which can cause spoilage. Long cooling conveyors have traditionally been used with liquid coolants such as water being used to speed up the cooling process.

The above systems are usually linear thus requiring large amounts of space for installation of the same. They also do not usually include any recirculation means since once the water is heated during the cooling process, it will cost more to cool it for recycling than it would to use additional fresh water while dumping the hot water. Thus large space requirements and large volumes of water have been required to effectively operate these prior known systems.

Although attempts have been made to reduce the floor space required by normal can cooling systems as well as means for reducing the water consumption thereof, up until now no completely suitable system has been developed.

BRIEF DESCRIPTION OF INVENTION

After much research and study into the above-mentioned problems, the present invention has been developed to provide a can cooling system which takes up a minimum of floor space and recirculates its cooling liquid thus greatly reducing the volume of such liquid required for any given number of units processed.

The above is accomplished through the utilization of multiple lanes in stacked configuration with the hot cans being introduced at the bottom and the cool cans being removed from the top. This combination additionally is less expensive to produce and maintain.

In view of the above, it is an object of the present invention to provide a cooling system for can type containers requiring a minimum of floor space.

Another object of the present invention is to provide a can type cooling system so constructed that the path followed by each can is a stacked zig-zag pattern.

Another object of the present invention is to provide a stacked path can type cooling system wherein the cans enter the lower portion thereof and exit the upper portion thereof.

Another object of the present invention is to provide a cooling system wherein the cooling liquid is applied to the cooler cans and then sequentially to the hotter cans.

Another object of the present invention is to provide a stacked conveyor can cooling system which imparts a spinning motion to the can as it is cooled thereby evenly cooling the interior contents thereof.

Another object of the present invention is to provide a stacked can cooling system including a cooling liquid recirculation means.

Other objects and advantages of the present invention will become apparent and obvious from a study of the following description and the accompanying drawings which are merely illustrative of such invention.

DETAILED DESCRIPTION OF THE INVENTION

With further reference to the drawings, the improved cooling system of the present invention, indicated generally at 10, includes a plurality of upright frames 11 which in turn support a plurality of horizontal frames 12.

Figure 3:
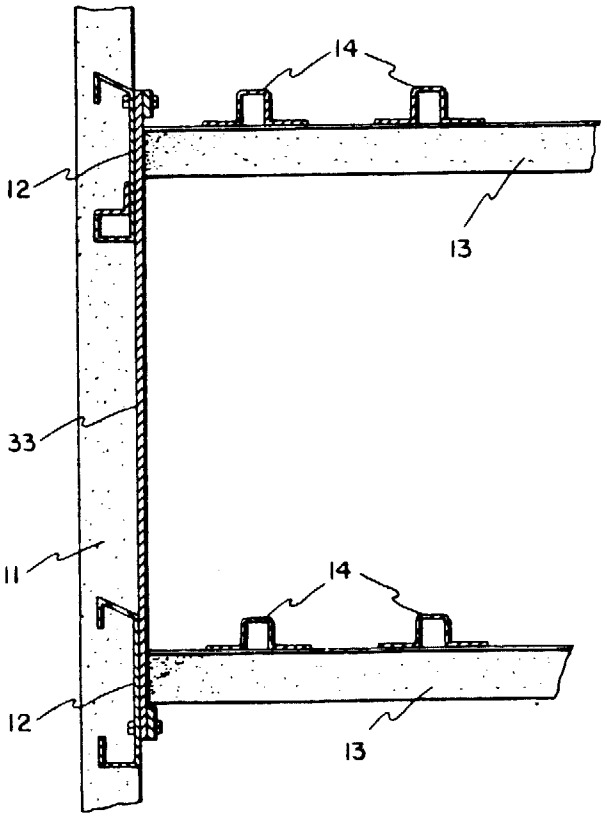
FIG. 3 is an enlarged sectional view of the track portion of the present invention.
Figure 2:
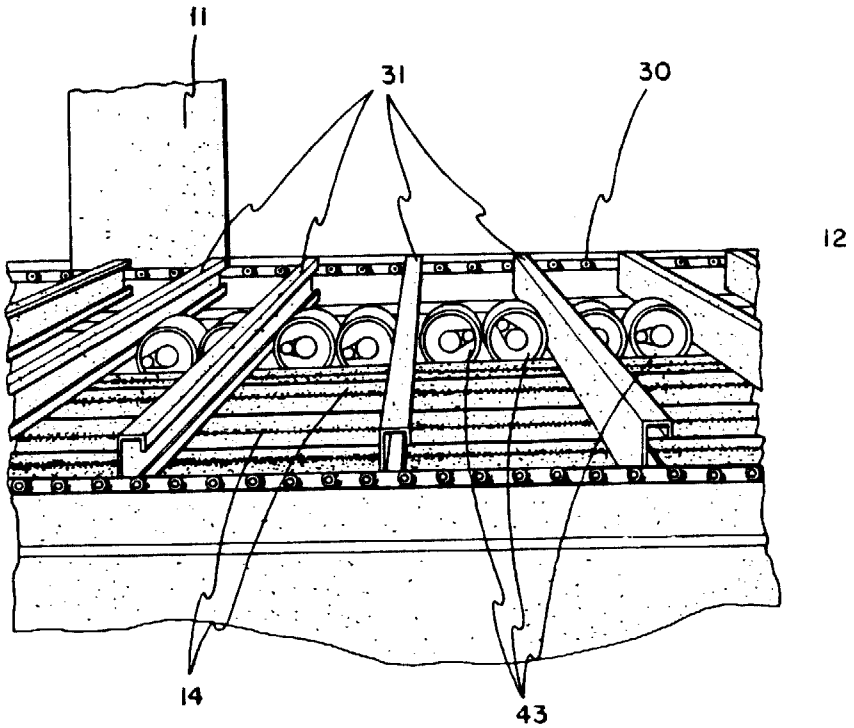
FIG. 2 is an enlarged perspective view of the track assembly and pusher bars of the present invention.

A plurality of track support frames 13 extend across the cooler system and are supported by horizontal frames 12 on opposite ends of such support frames Track rails 14 are mounted on track support frames 13 and are parallely disposed to each other as can clearly be seen in FIGS. 2 and 3. The horizontal portion of these rails form four tiers indicated generally from top to bottom as 15, 16, 17, and 18.

The track rails 14 on the top three tiers 15, 16, and 17 are all disposed parallel to each other and parallel to the horizontal frames 12. The track rails on the bottom tier 18 are disposed parallel to each other but at slight angle to the horizontal frames 12, said angle exactly equaling the distance between two of the rails from one end thereof to the other. This angulation of the lower tier of track rails effectively forms a cross-over or lane change so that cans entering the lower tier from the tier and lane directly above will be one lane over when they are again moved back up to tier 17. This lane switch is shown in dotted lanes in FIG. 5 and will hereinafter be described in greater detail.

Figure 4:
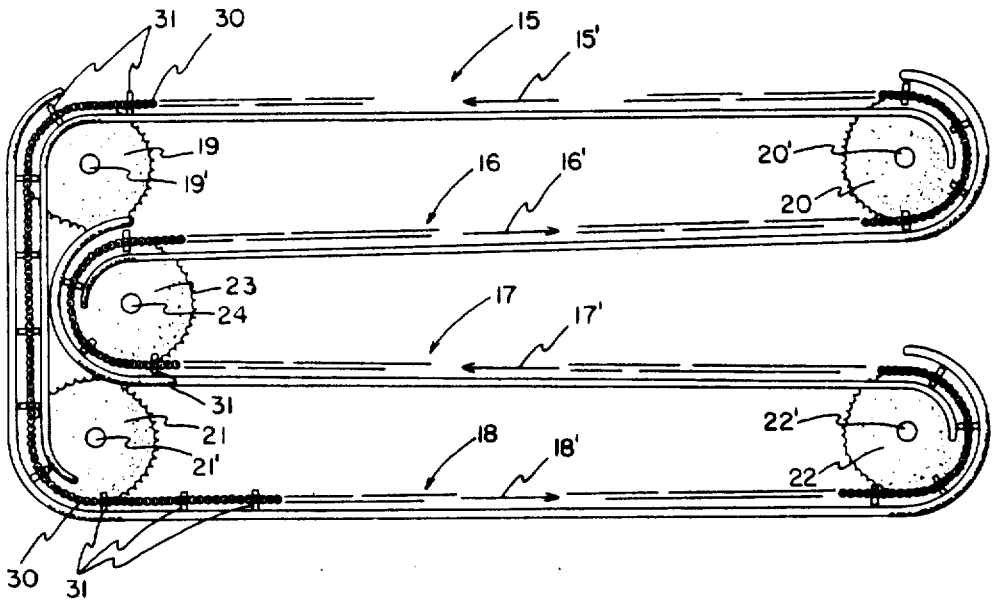
FIG. 4 is a somewhat schematic representation of the pusher bar drive system of the present invention.

Disposed between the two upper tiers 15 and 16 at opposite ends thereof, as seen clearly in FIG. 4, are idler sprockets 19 and 20. These idler sprockets are paired with one being on each side of the tiers and are mounted on shafts 19' and 20°, respectively.

Second pairs of idler sprockets 21 and 22 are disposed at opposite ends of the lower two tiers 17 and 18 and are paired as are idler sprockets 19 and 20. These last mentioned sprockets are rotatively mounted on their respective idler shafts 21' and 22'.

A pair of drive sprockets 23 are disposed on opposite sides of intermediate tiers 16 and 17 adjacent idler sprockets 19 and 21. This pair of chain drive sprockets 23 are fixedly mounted on drive shaft 24. One end of this drive shaft projects outwardly from the side of the cooling system 10 and has fixedly mounted thereon large drive sprocket 25.

Figure 6:
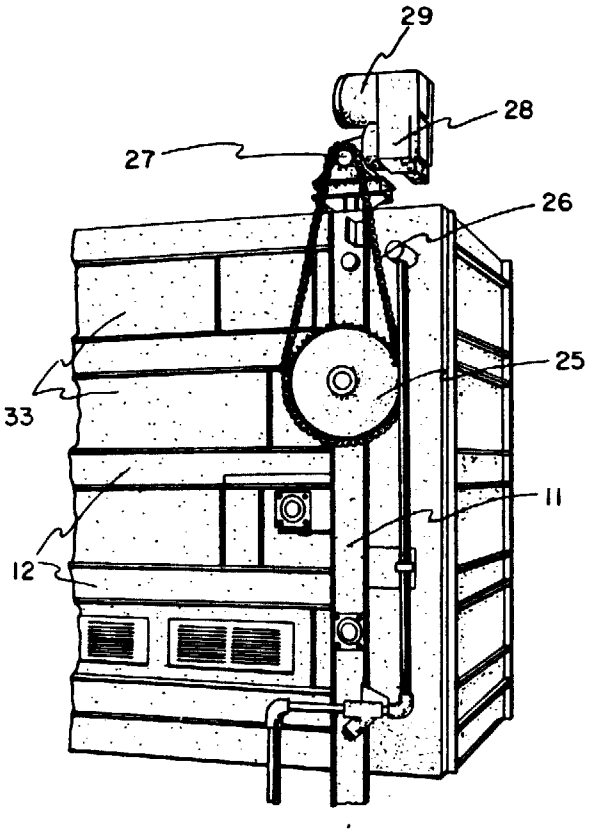
FIG. 6 is a perspective view showing the pusher bar drive system.

Drive chain 26 is trained over large drive sprocket 25 as well as over small drive sprocket 27 as can clearly be seen in FIG. 6. This last mentioned drive sprocket is driven by reducer 28 which in turn is driven by motor 29 in the normal manner of such devices.

A pusher bar chain 30 is trained about each pair of sprockets from drive sprocket 23, over idler sprockets 19, 20, 21, and 22, and back to drive sprocket 23 as seen clearly in FIG. 4. Extending between and secured to the pairs of pusher bar chains 30 are a plurality of spaced pusher bars 31. The spacing between these pusher bars is such that without internal adjustments the cooler 10 of the present invention will accommodate a wide range of different size containers.

The track rails forming the upper tier 15 are curved downwardly approximately 90 degrees adjacent idler sprocket 20 at one end and are curved downwardly adjacent idler sprocket 19 to a point just above bottom tier 18 at the other end as can clearly be seen in FIG. 4.

The track rails forming tier 16 begin immediately above top tier 15 at the end of idler sprockets 20 and extend downwardly a little over 90 degrees at the end adjacent drive sprockets 23.

The track rails forming tier 17 begin immediately above tier 16 adjacent the end of drive sprockets 23 and extend downwardly slightly over 90 degrees slightly at the end adjacent idler sprockets 22.

Finally the track rails of tier 18 begin immediately above tier 17 adjacent the end of sprockets 22 and extend upwardly on the outside of the pusher bars 31 to a point adjacent upper tier 15 at the end adjacent idler sprockets 21, again all this can clearly be seen in FIG. 4.

The top 32 of the cooling system 10 is formed from sheet metal and is air tight. Air impervious side panels 33 are provided between the upright frames 11 and the horizontal frames 12. These side panels are removable for maintenance of the system but are otherwise left in place.

Ventilator panels 34 have fixed louvers 35 formed therein and are removably mounted immediately below side panels 33.

Air impervious end panels 35 are provided and are removably mounted for maintenance purposes.

The bottom 26 of the cooling system 10, along with side walls 37 and end walls 38 form a tank like structure. An internal wall or dam 39 runs longitudinally the length of the system thus forming sumps 40 and 41. Although only one wall or dam is shown forming only two sumps, it is to be understood that additional walls could be provided thus forming three or more sump areas in the lower portion of the system 10 of the present invention. The purpose of dividing the lower portion of the system into different sumps will hereinafter be discussed in greater detail.

Figure 1:
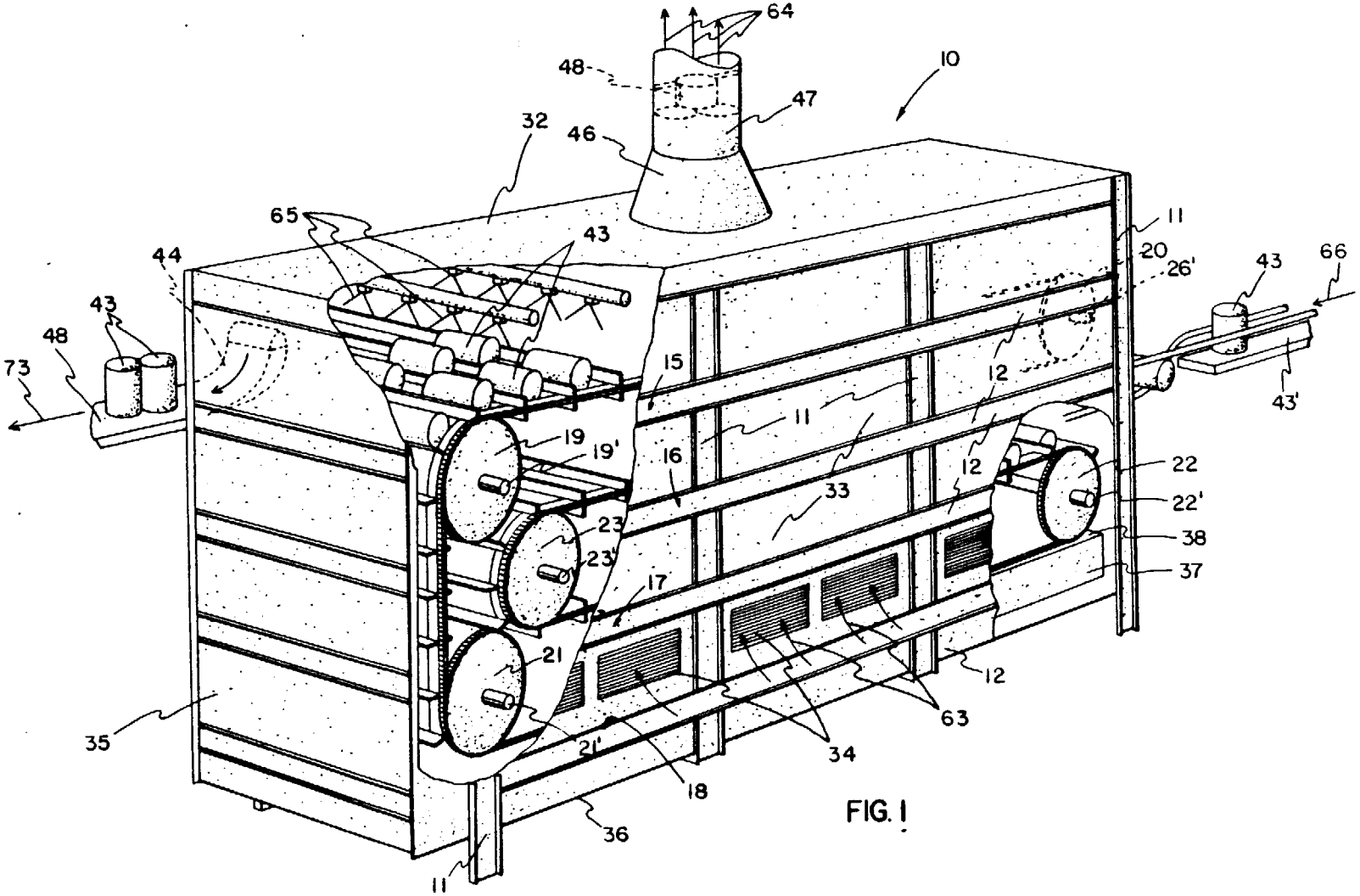
FIG. 1 is a partially cutaway perspective view of the improved cooling system of the present invention.

At one end of the cooling system 10 of the present invention is provided a twist chute 42 which takes a can or other container 43 from an inlet conveyor 44 and orients it from vertical to horizontal prior to entering the system at tier 17 as can clearly been seen in FIG. 1.

Conversely an outlet twist chute 44 is provided adjacent upper tier 15 and is adapted to operatively carry the cooled product from the cooling system 10 and deposit the same in correct orientation on outlet conveyor 45.

Communicating through top 32 is an exhaust hood 46 operatively connected to exhaust stack 47 which includes a forced air drive means as indicated by dotted lines 48.

At least one pump means is provided for each of the sumps 40 and 41 and are designated at 49 and 50. These pumps are connected to their respective sumps by sump lines 51 and 52. Outlet lines 53 and 54 lead to headers 55 and 56 which are attached to spray tubes 57 and 58. These spray tubes operatively mount spray nozzles 59. These spray tubes and spray nozzles cover almost the entire area immediately below top 32.

Figure 7:
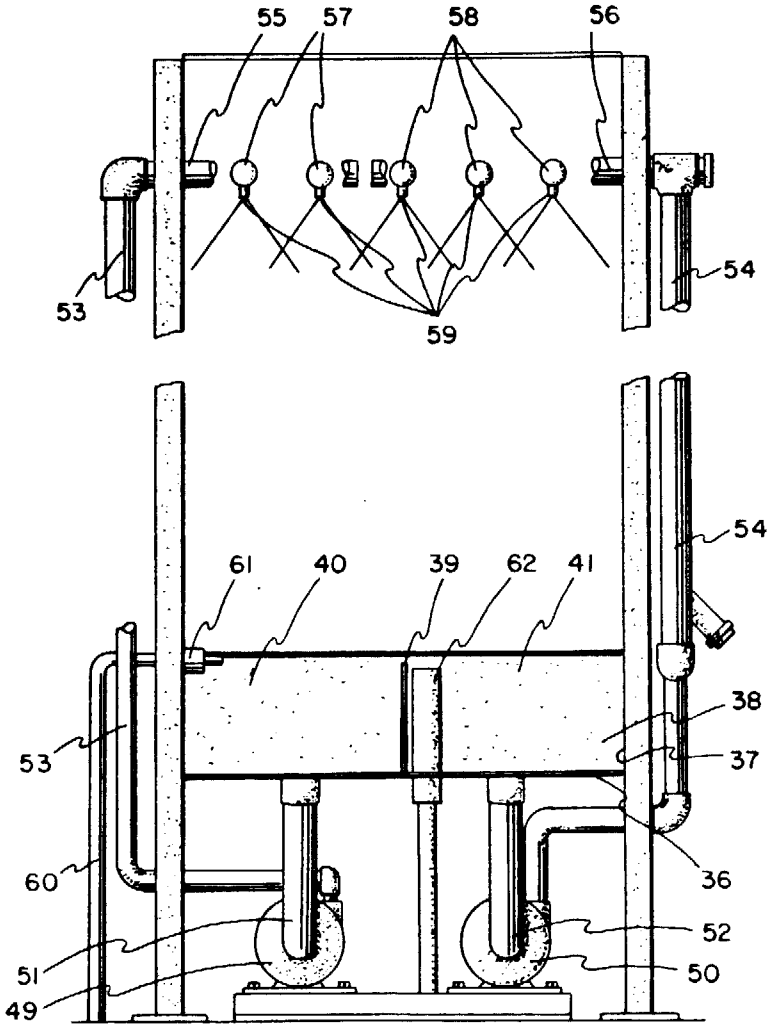
FIG. 7 is a somewhat schematic view of the cooling portion of the present invention.

A fresh water inlet line 60 comes from a standard water supply, passes through a controlling means 61 and into sump 40 as can be seen clearly in FIG. 7. A waste water line 62 is provided in sump 41 and leads to a disposal area such as the municipal sewer.

Figure 5:
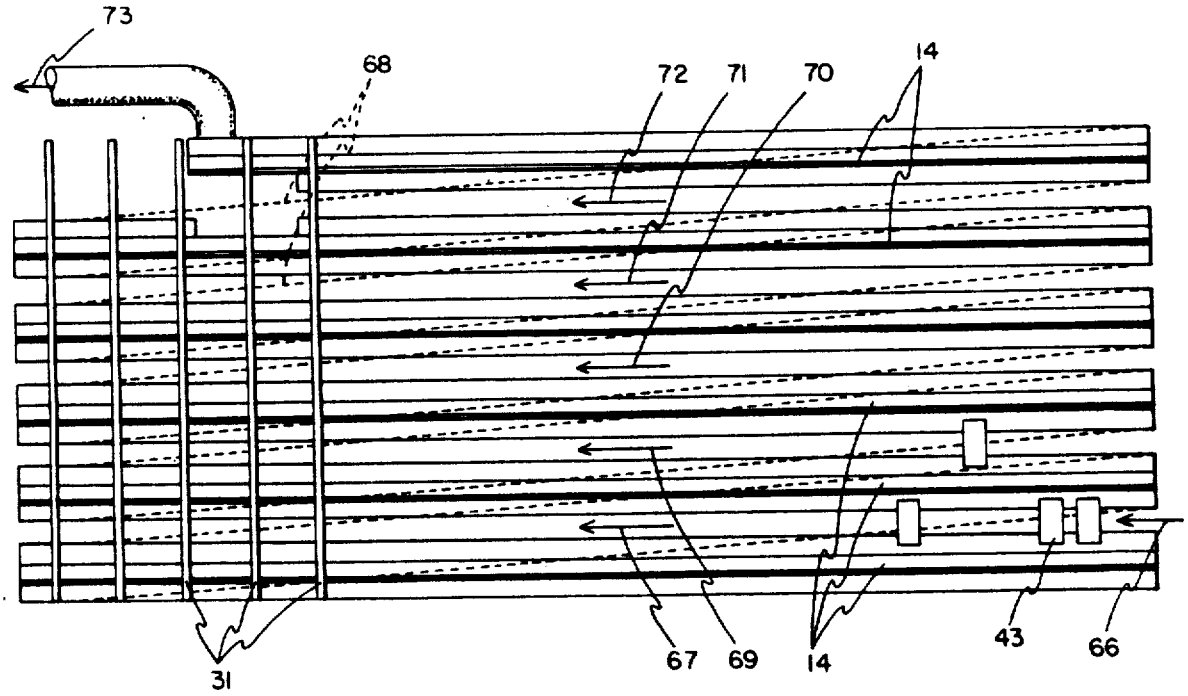
FIG. 5 is a somewhat schematic representation of the track paths of the present invention.

The various lanes formed between the track rails 14 within the cooling system 10 of the present invention are illustrated schematically in FIG. 5. The inlet indicated by arrow 66 comes into lane one, indicated by arrow 67 on tier 17. The cans are moved along such tier by pusher bars 31 and at the end of such tier move upwardly adjacent sprockets 23 between the curved track rails to tier 16. The cans continue to move as indicated by arrow 16' in FIG. 4 until they approach idler sprockets 20 where the track rails carry such cans up to tier 15. They continue to move as indicated by arrow 15' to the area adjacent idler sprockets 19 where such cans move downwardly between the track rails to the area adjacent idler sprockets 21. Here they enter tier 18 and continue to move as indicated by arrow 18'. The track rails forming the various lanes on tier 18 are offset one lane from the point the cans enter tier 18 to the point where they exit such tier. These shift lanes are indicated by broken lines 68 in the lane schematic shown in FIG. 5. Thus as the cans 43 move upwardly between the curved track rails adjacent idler sprockets 22, they will move into lane two 69 of tier 17.

The cans 43 continue to move through the system 10 of the present invention as described above, each time shifting one lane as they come pass tier 18, i.e., from one lane two 69, to lane three 70, to lane four 71, and finally to lane five 72. From lane five of upper tier 15 the cans automatically discharge as indicated by arrow 73.

Because of the multi-tiered, multi-laned track system of the present invention, a can will travel for, example, up to twelve hundred linear feet in a cooling system taking up only 30 linear feet. Thus a forty to one space reduction is achieved over conventional in-line cooling conveyors.

The cooling system 10 of the present invention includes the two sumps 40 and 41 described above which, through sump line 51 and pump 49, delivers water to header 55 and to spray tubes 57. It should be noted that these spray tubes are located directly over sump 40 while spray tubes 58 discharge water from sump 41 and are located directly thereabove.

Make-up water, which is supplied in limited amounts, can be controlled by any suitable means such as controller 61 which can be a float valve or other similar means. As make-up water is added, any overflow moves across dam 39 top sump 41 where the access is removed by discharge through overflow pipe 62. The reason for this arrangement is that sump 40, which receives the cool make-up water, sprays on the last two lanes 71 and 72 which are the coolest containers. Thus it can clearly be seen that water from each of the individual sumps removes the maximum amount of heat from the cans being processed under the respective spray tubes.

Although the spray tubes are only located at the top of the cooling system of the present invention, water therefrom moves down between the openings in the track rails 14 thereby cooling all of the tiers or levels of the conveying system.

The exhaust fan 48 located adjacent exhaust hood 46 on the top 32 of the cooler 10 draws outside air in through louvered panels 34 at the bottom of each cooler and sucks it through the water spray thus absorbing heat therefrom. As the heat saturated air leaves the cooler through the exhaust stack, a major part of the heat load is removed therewith. The balance of the heat load is removed through the water overflow in the sumps as hereinabove described.

It has been found that when the circulating pumps 49 and 50 use headers of 1½ and 2 inch diameters, respectively, with the spray nozzles 59 being on eight inch centers in spray tubes 57, adequate cooling can be accomplished. The spray nozzles preferably have 13/64 inch orifices and the two headers deliver 1.1 gallons per minute at 10 psi in spray tubes 57 and 2.1 gallons per minute at 20 psi in spray tubes 58.

The pusher bars 31 are driven by a 1½ horsepower motor 21 with a variable speed drive 28 which allows the drive chains 30 to move at any selected speed between twenty-five and seventy-five feet per minute.

Since the cans 43 propelled by the pusher bars 31 roll along the track rails 14, they will rotate or spin in one direction on one tier and will roll or spin in the opposite direction on the next tier thus changing direction some twenty times in a four tier, five lane system described herein. This spinning and changing of spin direction agitates the interior contents of the product being cooled thus greatly enhancing the efficiency of heat transfer from the product.

Although for simplicity in description, only a single inlet, single discharge system has been described, it is to be understood that additional lanes could be added with crossovers moving in opposite directions so that a dual or twin system could be operated from the same drive means.

Also the present invention is intended to be a modular system wherein additional sections of track rails can be added to extend the length of the cooler and thereby multiplying the travel distance for any given container to be cooled.

Finally mild vertical vibrations can be added when viscous products are being processed. Vibrations of two cycles per second at an amplitude one-fourth inch have been found to reduce the cooling time of light sauces and soups by approximately thirty percent.

From the above it can be seen that the present invention has been developed to provide a very compact and yet highly efficient cooling system which can be extended or reduced in size as need dictates.

The present invention may, of course, be carried out in other specific ways than there herein set forth without departing from the spirit and essential characteristics of the invention. The present embodiments are, therefore, to be considered in all respects as illustrative and not restrictive, and all changes coming within the meaning and equivalency range of the appended claim are intended to be embraced therein.

What is claimed is:

1. An improved cooling system for product containers comprising: a plurality of track rail means so arranged to form a plurality of laterally adjacent product container travel lanes each containing a plurality of tiers; entry and exit means to and from said travel lanes for product containers; a plurality of crossovers for interconnecting each said product container travel lane with at least one adjacent lane such that product containers move from one lane to an adjacent lane at said crossovers; a plurality of pusher bar means extending across said lanes for rollingly moving said containers therealong; means for interconnectingly driving said pusher bar means such that said containers travel substantially the entire length of every lane in every tier prior to exiting said cooling system [so as to properly cool the product therein while said system requires only a relatively small amount of floor space; and means for forming an active cooling system for cooling product containers so they move along said lanes]*; a plurality of nozzles disposed above selected lanes of said tiers for spraying cooling water over the product containers as the same move through said cooling system; and at least two laterally adjacent sump means disposed below said tiers for recirculating water sprayed from said nozzles, each said sump being operatively connected to selected nozzles disposed above selected lanes of said tiers, whereby more efficient cooling of product containers can be accomplished while said cooling system requires only a relatively small amount of floor space.*

[2. The system of claim 1 wherein said active cooling system is in the form of a plurality of nozzles which spray water over the product containers.]

[3. The system of claim 2 wherein said nozzles are disposed above said tiers.]

[4. The system of claim 2 wherein such system is disposed generally within an enclosed housing and including a means for forcing air through said housing whereby greater cooling efficiency can be accomplished.]

[5. The system of claim 2 including at least one sump means disposed below said tiers whereby cooling water from said nozzles can be recirculated.]

[6. The system of claim 2 wherein at least two sump means are disposed below said tiers whereby cooling water from said nozzles can be recirculated.]

[7. The system of claim 6 wherein each of said sumps are operatively connected to selected nozzles disposed above selected lanes of said tiers whereby more efficient cooling can be accomplished.]

8. The system of claim 1 wherein such system is disposed generally within an enclosed housing.

9. The system of claim 8 including a means for forcing air through said housing whereby greater cooling efficiency can be accomplished.

10. The system of claim 9 wherein the means for forcing said air through said housing is a fan type means.

11. The system of claim 9 wherein said forced air enters the lower portion of said housing and is exhausted from the upper portion thereof.

*12. The improved cooling system of claim 1 wherein each product container travel lane has at least three vertically spaced tiers.*

*13. The improved cooling system of claim 1 wherein each product container travel lane has at least four tiers.*

*14. The improved cooling system of claim 1 wherein the cooling water in each sump means is of a different temperature whereby distinct cooling zones are established laterally across such improved cooling system.*

* * * * *